United States Patent [19]

Weaver et al.

[11] Patent Number: 4,826,903

[45] Date of Patent: May 2, 1989

[54] CONDENSATION POLYMER CONTAINING THE RESIDUE OF AN ACYLOXYSTYRL COMPOUND AND SHAPED ARTICLES PRODUCED THEREFROM

[75] Inventors: Max A. Weaver, Kingsport; Samuel D. Hilbert, Jonesborough; Wayne P. Pruett; Clarence A. Coates, Jr., both of Kingsport, all of Tenn.

[73] Assignee: Eastman Kodak Company, Rochester, N.Y.

[21] Appl. No.: 158,819

[22] Filed: Feb. 22, 1988

[51] Int. Cl.$^4$ .............. C08G 63/52; C08K 5/47; C08K 5/42; C08K 5/34; C08K 5/10

[52] U.S. Cl. .............. 524/205; 524/83; 524/84; 524/92; 524/95; 524/96; 524/100; 524/111; 524/158; 524/171; 524/183; 524/192; 524/198; 524/199; 524/281; 524/291; 524/292; 524/294; 528/170; 528/171; 528/183; 528/192

[58] Field of Search .............. 526/301; 528/171, 304, 528/170, 303, 302, 75, 183, 196, 295, 289, 288, 192; 560/130, 146, 25, 86; 525/444; 558/268, 292; 524/205, 219, 281, 289, 294, 299, 158, 198, 199, 291, 292, 83, 84, 92, 95, 96, 100, 111

[56] References Cited

U.S. PATENT DOCUMENTS

| | | | |
|---|---|---|---|
| 3,634,320 | 1/1972 | Metzner et al. | 524/287 |
| 4,305,719 | 12/1981 | Zannucci et al. | 8/662 |
| 4,338,247 | 7/1982 | Zannucci et al. | 528/307 |
| 4,340,718 | 7/1982 | Zannucci et al. | 528/128 |
| 4,455,368 | 6/1984 | Kojima et al. | 526/301 |
| 4,523,008 | 6/1985 | Vogl et al. | 528/303 |
| 4,543,397 | 9/1985 | Woods et al. | 560/25 |
| 4,617,374 | 10/1986 | Pruett et al. | 528/288 |
| 4,690,995 | 9/1987 | Kesky et al. | 526/301 |
| 4,707,537 | 11/1987 | Pruett et al. | 528/288 |
| 4,749,722 | 6/1988 | Weaver et al. | 528/303 |
| 4,749,773 | 6/1988 | Weaver et al. | 528/303 |

Primary Examiner—Veronica P. Hoke
Attorney, Agent, or Firm—J. Frederick Thomsen; William P. Heath, Jr.

[57] ABSTRACT

Composition useful for molding into articles such as food containers, beverage bottles, cured structural plastics and the like comprising molding grade linear or unsaturated polyester or polycarbonate (a) containing a mono-4-acryloxystyryl or bis-4-acyloxystyryl compound or (b) having reacted therewith or copolymerized therein a styryl residue derived from a mono-4-acryloxystyryl or bis-4-acyloxystyryl compound, having the formula

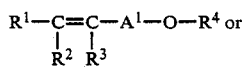

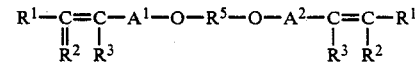

wherein
$R^4$ and $R^5$ represent the acyl radical and the other radicals are as defined in the specification.

Preferred compositions comprise a linear polyester containing a styryl residue as an integral part of the polymer chain. The styryl residues absorb ultraviolet radiation in the range of about 250 to about 390 nm. The residues are non-extractable from the polymer and stable at the conditions at which the polymers are manufactured and processed.

14 Claims, No Drawings

CONDENSATION POLYMER CONTAINING THE RESIDUE OF AN ACYLOXYSTYRL COMPOUND AND SHAPED ARTICLES PRODUCED THEREFROM

DESCRIPTION

This invention pertains to novel condensation polymers such as polyesters and polycarbonates wherein one or more acyloxystyryl moieties derived from certain acyloxystyryl compounds have been incorporated in the chain or backbone of the polymer. This invention also pertains to fibers and, particularly, to containers, such as those suitable for packaging beverages and foods, manufactured from our novel condensation polymers.

Many products such as certain fruit juices, soft drinks, wines, food products, cosmetics and shampoos are deleteriously affected, i.e., degraded, by ultraviolet (UV) light when packaged in clear plastic containers which pass significant portions of the available light at wavelengths in the range of approximately 250 to 390 nm. It is well known the polymers can be rendered resistant to degradation by UV light by physically blending in such polymers various UV light stabilizers such as benzophenones, benzotriazoles and resorcinol monobenzoates. See, for example, Plastics Additives Handbook, Hanser Publishers, Library of Congress, Catalog No. 83-062289, pp 128–134. Normally, such stabilizers are used in a weight concentration of at least 0.5 percent. Although these stabilizers generally function well to absorb radiation in the range of about 300 to 350 nm, absorbance in the range of 300 to 350 nm is not adequate to protect comestibles subject to UV light degradation packaged in clear plastic, i.e., essentially colorless, transparent plastics. The stabilizers present in many of the known stabilized polymer compositions can be extracted from the polymer by solvents such as acids, alcohols and the like present in foods or beverages packaged within the stabilized polymers. Furthermore, many compounds used to stabilize polymers are not stable at high temperatures and decompose under the conditions at which polyesters are manufactured or processed. Decomposition of such stabilizers frequently causes yellow discloration of the polymer and results in the polymer containing little, if any, of the stabilizer.

U.S. Pat. Nos. 4,617,374 and 4,707,537 disclose monostyryl compounds which can be reacted with or copolymerized into condensation for the purpose of absorbing UV light. However, the compounds disclosed in those patents are structurally dissimilar to those described hereinbelow in that the former do not contain an acyloxy radical bonded to an aromatic carbon atom of the styryl nucleus of the compounds.

U.S. Pat. No. 3,634,320 discloses certain bis-styryl compounds and their use as UV absorbers in various addition and condensation polymers. The patent does not specify that the bis-styryl compounds react or copolymerize with any of the condensation polymers disclosed. The bis-methine compounds were intended for use as stabilizers in concentrations in the polymer of up to 5%, preferably in the range of 0.1 to 0.2%.

U.S. Pat. Nos. 4,305,719, 4,338,247, 4,430,718 and 4,617,374 also disclose the concept of reacting styryl-type methine compounds capable of absorbing UV light with or into polyesters. These patents also do not disclose or teach the use of the acyloxystyryl compounds described hereinafter to obtain the compositions provided by this invention.

The novel polymer composition provided by our invention comprises molding or fiber grade condensation polymer (a) containing a mono-4-acyloxystyryl or bis-4-acyloxystyryl compound or (b) having reacted therewith or copolymerized therein a styryl residue derived from a mono-4-acyloxystyryl or bis-4-acyloxystyryl compound, having the formula:

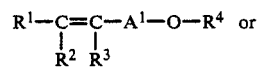

(I)

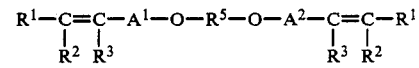

(II)

wherein
each $R^1$ is independently selected from cyano, carboxy, alkenyloxycarbonyl, or a substituted or unsubstituted alkoxycarbonyl, cycloalkoxycarbonyl or aryloxycarbonyl radical;
each $R^2$ is independently selected from one of the groups specified for $R^1$ or an unsubstituted or substituted carbamoyl, alkanoyl, cycloalkanoyl, aroyl, alkylsulfonyl, cycloalkylsulfonyl, arylsulfonyl or aromatic, carbocyclic, or heterocyclic radical;
each $R^3$ is independently selected from hydrogen or an unsubstituted or substituted alkyl, cycloalkyl or aryl radical;
$A^1$ and $A^2$ are independently selected from unsubstituted or substituted 1,4-phenylene radicals; and
$R^4$ is an unsubstituted or substituted organic acyl radical and $R^5$ is carbonyl, dicarbonyl or an unsubstituted or substituted organic diacyl radical.

The alkyl and alkoxy moieties of the groups recited in the definitions of $R^1$, $R^2$, and $R^3$ can be unsubstituted or substituted alkyl and alkoxy of up to 12 carbon atoms. Hydroxy, alkoxy, halogen, alkanoyloxy, alkoxycarbonyl, cyano, aryl, aryloxy, cycloalkyl, cycloalkoxy and alkylthio are examples of the substituents which may be present on the substituted alkyl groups and alkoxy moieties which $R^1$, $R^2$, and $R^3$ can represent. The cycloalkyl moieties of the groups recited in the definitions of $R^1$, $R^2$, and $R^3$ can be unsubstituted cycloalkyl of 5 to 7 carbon atoms which may be substituted with alkyl or any of the substituents mentioned hereinabove. The carbamoyl groups which $R^2$ can represent may be unsubstituted or substituted carbamoyl such as N-alkylcarbamoyl, N,N-dialkylcarbamoyl, N-cycloalkylcarbamoyl, N-alkyl-N-cycloalkylcarbamoyl, N-arylcarbamoyl, N-alkyl-N-arylcarbamoyl and the like.

The aryl moieties of the groups recited in the definitions of $R^1$, $R^2$, and $R^3$ can be unsubstituted or substituted carbocyclic aryl containing 6 to 12 carbon atoms. Examples of the substituents which may be present on the aryl and the carbocyclic and heterocyclic groups include alkyl and the substituents set forth in the preceding paragraph. Pyrolyl, pyridyl, pyrimidyl, 2-benzothiazolyl, 2-benzoxazolyl, 2-benzimidazolyl, 2-thienyl, 2-furanyl, 1,3,4-thiadiazol-2-yl, 1,2,4-thiadiazol-2-yl and groups having the structure:

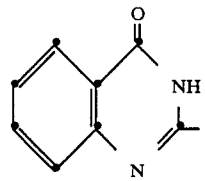

are examples of the unsubstituted aromatic heterocyclic residues which each $R^2$ may represent.

The 1,4-phenylene residues can be unsubstituted or substituted, for example, with alkyl, alkoxy, halogen, hydroxy, alkoxycarbonyl, etc. The preferred 1,4-phenylene radicals represented by $A^1$ and $A^2$ have the structure

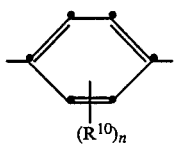

wherein $R^{10}$ is hydrogen, lower alkyl, lower alkoxy or halogen, and n is 1 or 2.

$A^1$ and $A^2$ most preferably are 1,4-phenylene or 1,4-phenylene substituted with one group selected from methyl, methoxy, ethoxy, or chloro.

Further descriptions and examples of the

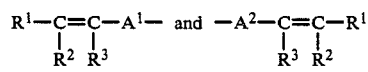

residues of the mono-acyloxystyryl compounds of formula (I) and the bis-acyloxystyryl compounds of formula (II) are set forth in U.S. Pat. Nos. 4,338,247, 4,340,718, 4,617,374 and 4,661,566, the disclosures of which are incorporated herein by reference. Although $R^3$ may represent certain substituents defined hereinabove, $R^3$ preferably is hydrogen.

The organic acyl radicals represented by $R^4$ include radicals derived from carboxylic acids, chloroformate esters, sulfonic acids, or carbamic acids or acylating (ester- or carbonate-forming) derivatives thereof. Typical of the $R^4$ acyl residues are the radicals

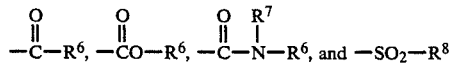

wherein
  $R^6$ is hydrogen, alkenyl, or an unsubstituted or substituted alkyl, cycloalkyl or carbocyclic or heterocyclic aryl radical;
  $R^7$ is hydrogen or an unsubstituted or substituted alkyl radical; and
  $R^8$ is an unsubstituted or substituted alkyl, cycloalkyl or aryl radical.

The description of the alkyl, cycloalkyl and aryl groups or moieties set forth hereinabove also is applicable to the groups represented by $R^6$, $R^7$, and $R^8$.

The organic diacyl radicals represented by $R^4$ are derived from the corresponding or analogous diacyl compounds such as dicarboxylic acid, bis-chloroformate esters, disulfonic acids or dicarbamic acids or acylating derivatives thereof. Examples of such diacyl residues include the groups having the formulas

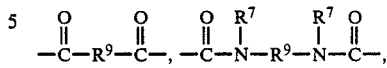

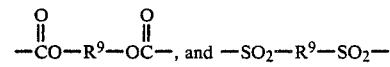

wherein $R^7$ is defined above and $R^9$ is a divalent organic linking group. $R^9$ can represent a wide variety of alkylene, alkenylene, alkynylene, cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene, or divalent aromatic heterocyclic groups. Examples of alkylene linking groups containing a cyclic moiety in the linking chain include:

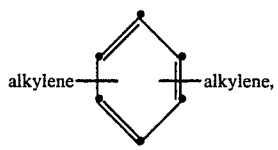

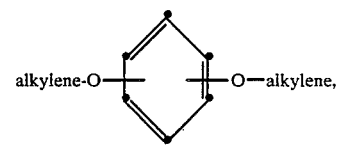

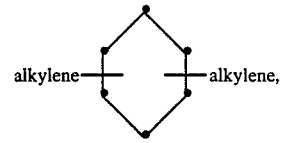

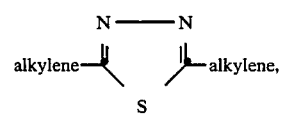

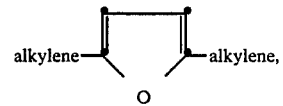

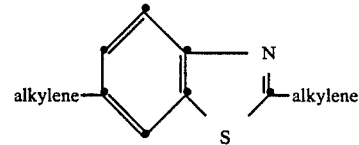

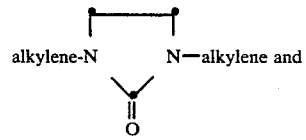

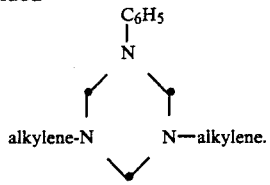

Cycloalkylene groups include 1,2-, 1,3- and 1,4-cyclohexylene. The carbocyclic arylene groups may be 1,2-, 1,3- and 1,4-phenylene and 2,6- and 2,7-naphthylene. Examples of the divalent heterocyclic groups include unsubstituted and substituted triazines such as 1,3,5-triazin-2,4-diyl and 6-methoxy-1,3,5-triazin-2,4-diyl; diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-pyridazindiyl; dicyanopyridines such as 3,5-dicyano-2,6-pyridindiyl and 4-phenyl-3,5-cyano-2,6-pyridindiyl; quinolines and isoquinolines such as 2,4-quinolindiyl and 2,8-isoquinolinediyl; quinoxalines such as 2,3-quinoxalindiyl; and azoles such as 2,5-thiazoldiyl, 5-methylene-2-thiazolyl, 3,5-isothiazoldiyl, 5-methylene-3-isothiazolyl, 1,3,4-thiadiazol-2,5-diyl, 1,2,4-thiadiazol-3,5-diyl, 2,6-benzothiazoldiyl, 2,5-benzoxazoldiyl, 2,6-benzimidazoldiyl, 6-methylene-2-benzothiazolyl and the group having the structure:

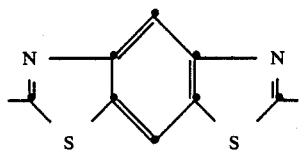

and maleimides such as 1-methyl-3,4-maleimidediyl and 1-phenyl-3,4-maleimidediyl. The acyclic moieties of the linking group represented by $R^9$ also may be substituted, for example, with hydroxy, alkoxy, halogen, alkanoyloxy, cyano, alkoxycarbonyl, aryl, aryloxy, cycloalkyl, etc. The cyclic moieties of linking group $R^9$ may be substituted with alkyl as well as with the substituents already mentioned. In addition to the possible substitution described above, the nitrogen atom of the nitrogen-containing alkylene groups may be substituted, for example, with alkyl, aryl, alkanoyl, aroyl, alkylsulfonyl, or carbamoyl, e.g.,

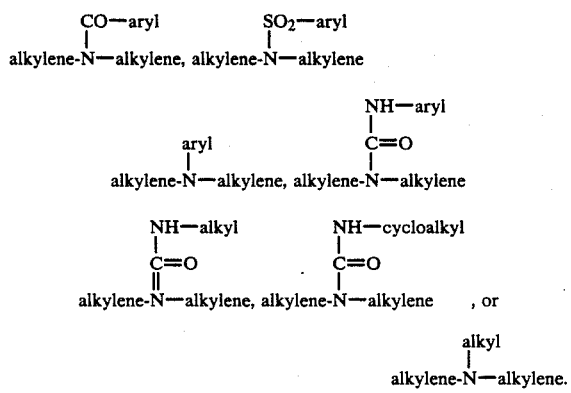

The 4-acyloxystyryl compounds described hereinabove and the polymer reacted residues derived therefrom possess excellent thermal stability, impart minimal yellow color upon incorporation into the polymer and exhibit little, if any, loss during high temperature processing of the polymer composition. When melt-blended into the condensation polymer, the compounds of formula (I) and (II) absorb light at relatively short UV wavelengths, with maximum absorption occurring at 290 nm to 320 nm, depending upon the structure of the compound concerned. When added to the polymer, e.g, poly(ethylene terephthalate), under polymer forming conditions, i.e., when reacted with or copolymerized in the polymer, absorption at longer wavelengths in the range of 345 nm to 365 nm is observed. Polyester compositions containing UV absorber which absorbs in the range of 345 nm to 365 nm are particularly valuable for use as packaging materials since light of such wavelength is not absorbed by the polyester and can degrade various type of product contained therein. The styryl compounds which absorb at shorter wavelengths are especially effective in reducing degradation of the polyester exposed to natural light since the shorter wavelength light is absorbed by the polyester itself causing degradation by bond cleavage.

The novel polymer compositions provided by this invention can be prepared by incorporating the 4-acyloxystyryl compounds into the polymer by melt-blending or by applying the compounds to the surface of the polymer, e.g., in pellet form, according to well-known techniques. The 4-acyloxystyryl compounds also may be added to coatings compositions containing a condensation polymer which can be applied to the surface of various shaped articles.

The preferred compositions of our invention comprise a condensation polymer, especially a thermoplastic, linear polyester, have reacted therein or copolymerized therewith a styryl residue derived from one or more of the compounds of formula (I) and/or (II). These preferred compositions are prepared by reacting one or more of the 4-acyloxystyryl compounds with the polymer during its preparation. For example, the styryl residues may be incorporated into or on the polymer chain by reacting one or more of the 4-acyloxystyryl compounds with the monomers, with a prepolymer or with the final polymer under polymer-forming conditions. Based on NMR and extraction data, it is believed that the acyl radical of the 4-acyloxystyryl is displaced by one of the polymer precursors. For example, when added to a polymer under polymer-forming conditions, the 4-acyloxystyryl compound of Example 1 reacts with the polymer to give:

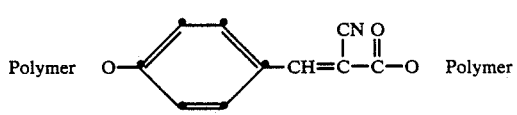

The 4-acyloxystyryl compound of Example 1 has a λ max in methylene chloride at 313 nm whereas poly(ethylene terephthalate) in which the styryl residue has been copolymerized absorbs light strongly in the range of 345 to 365 nm. The reaction of the 4-acyloxystyryl compounds is most easily accomplished when the acyl radical is derived from a carboxylic acid or chloroformate, i.e., when $R^4$ and $R^5$ are

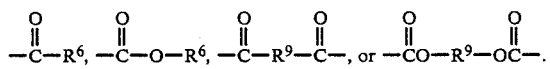

The novel polymer composition which are particularly preferred are linear polyesters having reacted therewith or copolymerized therein a styryl residue derived from an acyloxystyryl compound of formula (I) or (II) wherein $R^1$ is cyano or lower alkoxycarbonyl;

$R^2$ is lower alkoxycarbonyl, phenyl, or phenyl substituted with lower alkyl, lower alkoxy, carboxy or alkoxycarbonyl;

$R^3$ is hydrogen;

$A^1$ and $A^2$ each is 1,4-phenylene or 1,4-phenylene substituted with lower alkyl or lower alkoxy;

$R^4$ is lower alkanoyl, benzoyl or lower alkoxycarbonyl; and $R^5$ is a radical having the structure

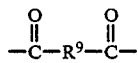

wherein $R^9$ is lower alkylene or phenylene; wherein lower designates a carbon content of up to 6 carbon atoms.

The 4-acyloxystyryl compounds of formula (I) and (II) can be prepared using known procedures by reacting intermediate carbonyl compounds (III) and (IV) with an active methylene compound (IV) under Knoevenagel reaction conditions using basic catalysts, e.g.,

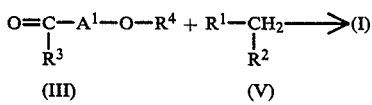

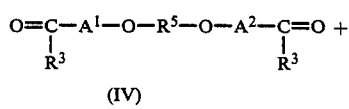

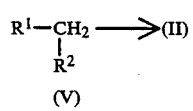

Carbonyl compounds (III) and (IV) may be obtained by reacting the analogous 4-hydroxyarylcarbonyl compound with various acylating agents or bis-acylating agents according to conventional procedures for preparing acyl esters. Alternatively, the 4-hydroxyarylcarbonyl compounds can first be reacted with the active methylene compound to prepare an intermediate 4-hydroxystyryl compound which then can be reacted with an acylating or bis-acylating agent to obtain compounds (I) and (II). Suitable starting aldehydes include 4-hydroxybenzaldehyde, 4-hydroxyacetophenone, 4-hydroxybenzophenone, 4-hydroxy-3-methoxybenzaldehyde, 4-hydroxy-2-methylbenzaldehyde, 3,5-dimethoxy-4-hydroxybenzaldehyde, 3-chloro-4-hydroxybenzaldehyde, etc. Acylating agents or bis-acylating agents which may be employed include acetic anhydride, phthalic anhydride, acetyl chloride, methyl chloroformate, terephthaloyl chloride, phenyl isocyanate, phenyl isothiocyanate, phenyl chloroformate, phosgene, m-phenylene diisocyanate, succinyl chloride, etc. Active methylenes can be selected from a wide variety of compounds but malonic acid esters, and cyanoacetic acid esters are particularly valuable. The Knoevenagel condensation reaction can be run in solvents such as alcohols, toluene, pyridine, N,N-dimethylformamide, etc. Bases such as piperidine, piperidine acetate, pyridine, and sodium acetate are effective basic catalysts for the reaction.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (IV) of about 0.4 to about 1.2. The preferred polyesters comprise at least about 50 mole percent terephthalic or 2,6-naphthylenedicarboxylic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The unsaturated, curable polyesters which may be used in our novel compositions are the polyesterification products of one or more glycols and one or more unsaturated dicarboxylic acids or their anhydrides. Typical of the unsaturated polyesters is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid and an aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

Solutions of such unsaturated polyester resins in an ethylenically-unsaturated monomer such as styrene commonly are referred to as polyester resins.

The unsaturated polyester resins may be prepared in the presence of gelation inhibitors such as hydroquinone or the like, which are well known in the art of polyesterification. The esterification may be carried out, for example, under an inert blanket of gas such as nitrogen in a temperature range of 118°–220° C. for a period of about 6–20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, isophthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mole percent propylene glycol, and as the acid component, from, about 75 to 100 mole percent o-phthalic and maleic acids in a mole ratio of from about $\frac{1}{2}$ to about 2/1. Typical of these unsaturated polyesters are those disclosed, for example, in U.S. Pat. No. 4,359,570 incorporated herein by reference.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

Typical polycarbonates useful herein are disclosed in Kirk-Othmer Encyclopedia of Chemical Technology, third edition, Volume 18, pages 479–494, incorporated herein by reference.

The novel polymer compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the preferred poly(ethylene terephthalate) and 1,4-cyclohexanedimethanol-modified poly(ethylene terephthalate) polyesters have an I.V. of 0.65 to 0.85, and a Tg of $>70°$ C., and film sections cut from the bottle have a Water Vapor Transmission Rate of 1.5 to 2.5 g mils/100 in.$^2$—24 hours, a Carbon Dioxide Permeability of 20–30 cc. mils/100 in.$^2$—24 hours-atm., and an Oxygen Permeability of 4–8 cc. mils/100 in.$^2$—24 hours-atm. The Tg is determined by Differential Scanning Calorimetry at a scan rate of 20 Centrigrade Degrees/min., the Oxygen Permeability by the standard operating procedure of a MOCON OXTRAN 100 instrument of Modern Controls, Inc., of Elk River, Minn., and the Carbon Dioxide Permeability by the standard operating procedure of a MOCON PERMATRAN C II, also of Modern Controls.

The concentration of the residue of the 4-acyloxystyryl compound in the condensation polymer can be varied substantially depending, for example, on the intended function of the UV-absorbing residue and/or the end use for which the polymer composition is intended. When the polymer composition is to be used in the fabrication of relatively thin-walled containers to screen UV light in the range of about 250 to 390 nm, the concentration of the residue of the 4-acyloxystyryl compound normally will be in the range of about 50 to 150 ppm (parts by weight per million parts by weight polymer) with the range of about 200 to 800 ppm being especially preferred.

When the levels of the ultra-violet light absorbers are increased to higher levels such as 5,000 ppm (0.5 weight percent) or higher, polymers containing these ultra-violet light absorbers show improved resistance to weathering and when these polymers per se or fibers thereof are dyed with disperse dyes, at a concentration, for example, of from about 0.01 to about 5.0% based on weight of polymer or fiber, many dyes exhibit increased lightfastness. Such disperse dyes are shown, for example, in U.S. Pat. Nos. 4,305,719; 2,746,952; 2,746,953; 2,757,173; 2,763,668; 2,771,466; 2,773,054; 2,777,863; 2,785,157; 2,790,791; 2,798,081; 2,805,218; 2,822,359; 2,827,450; 2,832,761; 2,852,504; 2,857,371; 2,865,909; 2,871,231; 3,072,683; 3,079,373; 3,079,375; 3,087,773; 3,096,318; e,096,332; 3,236,843; 3,254,073; 3,349,075; 3,380,990; 3,386,990; 3,394,144; 3,804,823; 3,816,388; 3,816,392; 3,829,410; 3,917,604; 3,928,311; 3,980,626; 3,998,801; 4,039,522; 4,052,379; and 4,140,683, the disclosures of which are incorporated herein by reference.

Polymer compositions containing substantially higher amounts, e.g., from about 2.0 to 10.0 weight percent, of the residue of one or more of the 4-acyloxystyryl compounds described herein may be used as polymer concentrates. Such concentrates may be blended with the same or different polymer according to conventional procedures to obtain polymer compositions which will contain a predetermined amount of the residue or residues in a non-extractable form. In the preparation of these highly loaded, polymer composition concentrates the residue preferably is divalent and thus is derived from a difunctional poly-methine compound such as the compound of Example 1.

The preparation of the mono-4-acyloxystyryl and bis-4-acyloxystyryl compounds and their use in preparing the compositions of our invention are further illustrated by the following examples.

EXAMPLE 1

A mixture of p-hydroxybenzaldehyde (6.1 g, 0.05 mol), methyl cyanoacetate (5.5 g, 0.055 mol), methanol (40 mL), and piperidine (5 drops) is heated at reflux for 1 hour. After being allowed to cool, the reaction mixture is acidified (to Congo Red test paper) by addition of 10% HCl. The product, methyl 2-cyano-3-(4-hydroxyphenyl)-2-propenoate, is collected by filtration, washed with methanol and dried in air. The purified product absorbs UV light strongly at 345 nm in acetone and has a molar extinction coefficient of 28,459.

A mixture of methyl 2-cyano-3-(4-hydroxyphenyl)-2-propenoate (20.3 g, 0.10 mol), acetic anhydride (15 mL), dry toluene, and concentrated sulfuric acid 91 drop) is heated at reflux for 3 hours. Upon cooling the reaction mixture, the product crystallizes and is collected by filtration, washed with hexane, and dried in air. The yield is about 20 g of white product, methyl 3-(4-acetoxyphenyl)-2-cyano-2-propenoate, which has a molar extinction coefficient of 23,876 in methylene chloride (λ max-313 nm). Mass spectroscopy analysis supports the structure expected from the reactants.

EXAMPLE 2

Methyl 2-cyano-3-(hydroxyphenyl)-2-propenoate (4.0 g, 0.02 mol) is dissolved in toluene (50 mL) containing pyridine (3 g). Methyl chloroformate (20 g, 0.02 mol) is added dropwise and the solution heated at reflux for 4 hours. The white product crystallizes upon cooling and is collected by filtration, washed with toluene, and dried in air. The yield is 28 g of product which exhibits an absorption maximum (λ max) at 314 nm. Mass spectroscopy analysis confirms that the product is the expected methyl 2-cyano-3-[4-[(methoxycarbonyl)oxy]phenyl]-2-propenoate.

EXAMPLE 3

To a solution of p-hydroxybenzaldehyde (24.4 g, 0.20 mol) dissolved in water (150 mL) containing 17.0 g of 50% sodium hydroxide is added portionwise p-toluenesulfonyl chloride (38.6 g, 0.20 mol). Heating is continued on steam bath for 4 hours and the reaction solution is then poured into water with stirring. Essentially a quantitative yield or product is obtained upon filtration. The product, 4-formylphenyl 4-methylbenzenesulfonate (supported by mass spectroscopy), is washed with water, and dried in air.

A mixture of the above sulfonate ester (2.76 g, 0.01 mol) methyl cyanoacetate (1.0 g, 0.01 mol), methanol (50 mL), piperidine (5 drops), and acetic acid (2 drops) is heated at reflux for 2 hours. Upon cooling, the product crystallizes and is collected by filtration, washed with methanol and dried in air. The yield is 3.0 g of methyl 2-cyano-3-[4[[4-methylphenylsulfonyl]oxy]-phenyl]-2-propenoate which has a λ max at 308 nm in methylene chloride.

EXAMPLE 4

To a solution of 17.0 g of 50% aqueous sodium hydroxide in water (150 mL) is added p-hydroxybenzaldehyde (24.4 g, 0.20 mol). Stirring is continued to complete solution and terephthaloyl chloride (20.3 g, 0.10 mol) is added portionwise and heating continued at reflux for 8 hours. The reaction mixture is cooled and the product (39.3 g) is collected by filtration, washed with water and dried. Mass spectroscopy confirms the product to be the expected bis 4-formylphenyl 1,4-benzenedicarboxylate.

A mixture of the above bis-ester (3.74 g, 0.01 mol), N,N-dimethylformamide (50 mL), methyl cyanoacetate (2.0 g, 0.02 mol), piperidine (5 drops) and acetic acid (2 drops) is heated on steam bath for 1 hour and then drowned into water. A small amount of saturated sodium chloride solution is added and the mixture stirred for a few minutes. The resulting solids are separated by filtration, washed with water and air dried.

The product, bis[4,(2-cyano-3-methoxy-3-oxo-1-propenyl)phenyl]1,4-benzenedicarboxylate, exhibits a strong absorption maximum at 313 nm is N,N-dimethylformamide.

Additional examples of 4-acyloxystyryl compounds which may be used in the preparation of our novel polymer compositions are set forth in Table I and II. The compounds may be prepared according to the procedures described above and conform to the formulas given in each table.

TABLE I

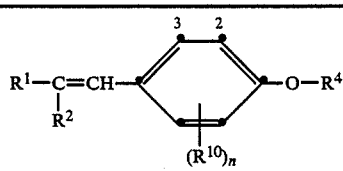

| Example | $R^1$ | $R^2$ | $(R^{10})_n$ | $R^4$ |
|---|---|---|---|---|
| 5 | —CN | —COOC$_2$H$_5$ | H | —COC$_2$H$_5$ |
| 6 | —COOCH$_3$ | —COOCH$_3$ | H | —COC$_6$H$_5$ |
| 7 | —CN | —CONH$_2$ | H | —COOC$_6$H$_5$ |
| 8 | —CN | —COO(CH$_2$)$_4$H | H | —COC$_6$H$_{11}$ |
| 9 | —CN | —COOCH$_2$CH$_2$OH | H | —COC—CHCH=CHO |
| 10 | —CN | —COOCH$_2$CH$_2$Cl | H | —COCH$_2$OH |
| 11 | —CN | —COOCH$_2$CH$_2$CN | H | —COCH$_2$C$_6$H$_5$ |
| 12 | —CN | —COOCH$_2$CH$_2$C$_6$H$_5$ | 2-OCH$_3$ | —COCH$_2$OC$_6$H$_5$ |
| 13 | —CN | —COO(CH$_2$CH$_2$O)$_2$H | 2-CH$_3$ | —COC$_6$H$_4$—4-OCH$_3$ |
| 14 | —CN | —COOC$_6$H$_5$ | 3,5-di-CH$_3$ | —SO$_2$CH$_3$ |
| 15 | —CN | —COOC$_6$H$_{11}$ | 3-CH$_3$ | —SO$_2$(CH$_2$)$_4$H |
| 16 | —COOCH$_3$ | —COOCH$_3$ | 2-Cl | —SO$_2$C$_6$H$_5$ |
| 17 | —CN | —CONHC$_6$H$_5$ | 2-C$_6$H$_5$ | —SO$_2$C$_6$H$_4$—3-Cl |
| 18 | —CN | —CONHC$_6$H$_{11}$ | H | —SO$_2$C=CHCH=CHS |

TABLE I-continued

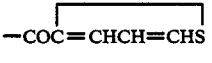

| Example | R¹ | R² | (R¹⁰)ₙ | R⁴ |
|---|---|---|---|---|
| 19 | —CN | —SO₂CH₃ | H | —COC=CHCH=CHS (cyclic) |
| 20 | —CN | —SO₂C₆H₅ | H | —COOC₂H₅ |
| 21 | —CN | —COOCH₂CH=CH₂ | H | —COO(CH₂)₄H |
| 22 | —CN | —COOC(CH₃)₃ | H | —COCH₂OCH₃ |
| 23 | —CN | —COC₆H₅ | H | —COCH₂Cl |
| 24 | —CN | —COOH | H | —COCH₂CH₂Cl |
| 25 | —CN | —CON(CH₂CH₂OH)₂ | H | —COCH₂CH₂NCOCH₂CH₂CO (cyclic) |
| 26 | —CN | —SO₂C₆H₄—3-Cl | H | —COCH₂CN |
| 27 | —CN | —C=N—o-C₆H₄—O (cyclic) | H | —COCH₃ |
| 28 | —CN | —C=N—o-C₆H₃—5-(COOCH₃)—O (cyclic) | H | —COCH₃ |
| 29 | —COOC₂H₅ | —COOC₂H₅ | H | —COH |
| 30 | —CN | —CN | H | —SO₂N(CH₃)₂ |
| 31 | —CN | —COOCH₃ | H | CON(C₂H₅)₂ |
| 32 | —CN | —C=N—o-C₆H₄NH (cyclic) | H | —CONHC₆H₅ |
| 33 | —CN | —C=N—o-C₆H₄S (cyclic) | H | —CONH(CH₂)₄H |
| 34 | —CN | —C=NN=C(CH₃)O (cyclic) | H | —CONHC₆H₁₁ |
| 35 | —CN | —C=CHN=CHCH=CH (cyclic) | H | —CONHCH₂OOCCH₃ |

TABLE II

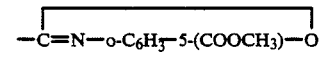

| Example | R¹ | R² | (R¹⁰)ₙ | R⁵ |
|---|---|---|---|---|
| 36 | —CN | —CN | H | —COCH₂CH₂CO— |
| 37 | —CN | —COOCH₃ | H | —COCH₂OCH₂CO— |
| 38 | —CN | —SO₂CH₃ | H | —COCH₂SCH₂CO— |
| 39 | —CN | —CONH₂ | H | —COCH₂N(CH₃)CH₂CO— |
| 40 | —CN | —C₆H₄—4-COOCH₃ | H | —COC₆H₄—3-CO— |
| 41 | —CN | —CONHCH₂CH₂OH | H | —COCH₂CH₂OCH₂CH₂CO— |
| 42 | —CN | —C₆H₄—4-CN | H | —COC₆H₄—2-CO— |
| 43 | —COOCH₃ | —COOCH₃ | H | —COOCH₂CH₂COO— |
| 44 | —COOC₂H₅ | —COOC₂H₅ | 3-CH₃ | —COCH₂C₆H₄—4-CH₂CO— |
| 45 | —CN | —COOC₆H₅ | 2-CH₃ | —COC₆H₁₀—4-CO— |
| 46 | —CN | —COC(CH₃)₂ | 2-Cl | —CO— |
| 47 | —CN | —C=N—o-C₆H₃—5-(COOCH₃)—O (cyclic) | 2,6-di-CH₃ | —SO₂(CH₂)₄SO₂— |

TABLE II-continued $$R^1-\underset{R^2}{C}=CH-\underset{(R^{10})_n}{\underset{3\ 2}{\bigcirc}}-O-R^5-O-\underset{(R^{10})_n}{\underset{2\ 3}{\bigcirc}}-CH=\underset{R^2}{C}-R^1$$

| Example | R¹ | R² | (R¹⁰)ₙ | R⁵ |
|---|---|---|---|---|
| 48 | —COOC₂H₅ | —C=N—o-C₆H₄O | 2-C₆H₅ | —SO₂C₆H₄—3-SO₂— |
| 49 | —COOCH₃ | —C=N—o-C₆H₄S | H | —COCH₂C₆H₁₀—4-CH₂CO— |
| 50 | —COOCH₃ | —C=N—o-C₆H₄NCH₃ | H | —CONHC₆H₄—3-NHCO— |
| 51 | —CN | —COOCH₂CH₂OH | H | —CONHC₆H₁₀—4-NHCO— |
| 52 | —COOCH₂CH₂OH | —COOCH₂CH₂OH | H | —CONHC₆H₃—4-CH₃—3-NHCO— |
| 53 | —COOCH₃ | —COC₆H₅ | H | —CONH(CH₂)₄NHCO— |
| 54 | —CN | —CN | H | —COCH₂CH(CH₃)CH₂CO— |
| 55 | —CN | —SO₂C₆H₄—4-Cl | 2-OCH₃ | —COC=CHCH=C(CO—)S |
| 56 | —CN | —CONHC₆H₄—4-CH₂CH₂OH | 2-OC₆H₅ | —COC=CHCH=C(CO—)O |
| 57 | —CN | —C=NCH=CHCH=N | 2,6-di-OCH₃ | 2-CO—naphthylene-6-CO— |
| 58 | —CN | —C=N—o-C₆H₄C(O)NCH₃ | H | —COCH₂C₆H₁₀—4-CH₂CO— |
| 59 | —CN | —COOCH₂C₆H₅ | H | —CON(CH₃)CH₂CH₂N(CH₃)CO— |
| 60 | —CN | —CN | H | —CO—o-C₆H₃—4-(COOH)—CO— |
| 61 | —CN | —COOCH₂CH₂CN | H | —COCH=CHCO— |
| 62 | —CN | —COOCH₂CH=CH₂ | H | —COCO— |
| 63 | —CN | —SO₂(CH₂)₄H | H | —CO(CH₂)₄CO— |
| 64 | —CN | —COOCH₃ | H | —CSNHC₆H₄—3-NHCS— |

EXAMPLE 65

The following materials are placed in a 500-mL three-necked, round-bottom flask:
97 g (0.5 mol) dimethyl terephthalate
62 g (1.0 mol) ethylene glycol
0.00192 g Ti from a n-butanol solution of acetyl-triisopropyl titanate
0.0072 g Mn from an ethylene glycol solution of manganese acetate
0.0345 g Antimony trioxide
0.0072 g Co from an ethylene glycol solution of cobaltous acetate.

The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (Zonyl A) which contains 0.012 g phosphorus is added. The temperature of the bath is increased to 230° C. At 230° C. methyl 3-(4-acetoxyphenyl)-2-cyano-2-propenoate (0.0384 g) prepared in Example 1 is added to the flask. Five minutes after this addition, a vacuum with a slow stream of nitrogen bleeding in the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.55 measured in a 60/40 ratio by weight of phenol/tetrachloroethane at a concentration of 0.5 g per 100 mL. An amorphous 14.5-mil thick film molded from this polymer to simulate the sidewall of a container transmits less than 10% light from 250 to 368 nm where a 14.5-mil film prepared from a like polyester without the copolymerized absorber transmits greater than 10% light at all wavelengths above 320 nm.

EXAMPLE 66

The procedure described in Example 65 is repeated using 0.0384 g (440 ppm) of methyl 2-cyano-3[4-[(methoxycarbonyl)oxy]phenyl]-2-propenoate of Example 2 instead of the 4-acyloxystyryl compound used in Example 65. The resulting polymer has an inherent viscosity of 0.54. An amorphous 16.5-mil thick film molded from this polymer transmits less than 10% light from 250 to 370 nm whereas a 16.5-mil film prepared from a like polyester without the copolymerized absorber transmits greater than 10% light at all wavelengths above 320 nm.

EXAMPLE 67

The procedure described in Example 65 is repeated using 0.0384 g (400 ppm) of bis[4-(2-cyano-3-methoxy-3-oxo-1-propenyl)phenyl]1,4-benzenedicarboxylate obtained in Example 4 instead of the 4-acyloxystyryl compound used in Example 65. The resulting polymer has an inherent viscosity of 0.52 measured in a 60/40 ratio by weight of phenol/tetrachloroethane at a concentration of 0.5 g per 100 mL. An amorphous 15-mil thick film molded from this polymer shows a strong absorption peak with a maximum at 345 nm.

The inherent viscosities (I.V. of the copolyesters described herein are determined according to ASTM D2857-70 procedure in a Wagner Viscometer of Lab Glass Inc. of Vineland, N.J., having a ¼ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}\ 25°\ C.\ 0.50\% = \frac{\ln \frac{t_s}{t_0}}{C}$$

where:
- $\{\eta\}$ = Inherent viscosity at 25° C. at a polymer concentration of 0.5 g/100 mL of solvent;
- ln = Natural logarithm;
- $t_s$ = Sample flow time;
- $t_0$ = Solvent-blank flow time; and
- C = Concentration of polymer in grams per 100 mL of solvent = 0.50.

The nonextractabilities of the styryl residues described herein are determined as follows:

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 mL solvent 100 in.² surface-area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water

The samples at room temperature are added to solvent and heated at 250° F. for 2 hours. Half of the samples are then analyzed and the remainder are placed in a 120° F. oven for 30 days and then analyzed.

2. 50% Ethanol/Water

The samples at room temperature are added to the solvent at room temperature, placed in an oven at 120° F. and analyzed after 24 hours. Another set of samples is aged for 30 days at 120° F. and then analyzed.

3. Heptane

The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

Any suitable analytical technique and apparatus may be employed to determine the amount of styryl residue extracted from the polymer.

The invention has been described in detail with particular reference to preferred embodiments thereof, but it will be understood that variations and modifications can be effected within the spirit and scope of the invention.

We claim:

1. A composition comprising molding or fiber-grade polyester polymer (a) containing an ultra violet light stabilizing amount of a mono-4-acyloxystyryl or bis-4-acyloxystyryl compound or (b) having reacted therewith or copolymerized therein an ultra violet light stabilizing amount of a styryl residue derived from a mono-4-acyloxystyryl or bis-4-acyloxystyryl compound, having the formula:

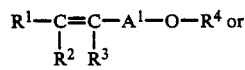

or

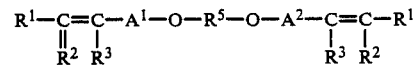

wherein
- each $R^1$ is independently selected from cyano, carboxy, alkenyloxycarbonyl, or a substituted or unsubstituted alkoxycarbonyl, cycloalkoxoycarbonyl or aryloxycarbonyl radical;
- each $R^2$ is independently selected from one of the groups specified for $R^1$ or an unsubstituted or substituted carbamoyl, alkanoyl, cycloalkanoyl, aroyl, alkylsulfonyl, cycloalkylsulfonyl, arylsulfonyl or aromatic, carbocyclic or heterocyclic radical;
- each $R^3$ is independently selected from hydrogen or an unsubstituted or substituted alkyl, cycloalkyl or aryl radical;
- $A^1$ and $A^2$ are independently selected from 1,4-phenylene radicals; and
- $R^4$ is an unsubstituted or substituted organic acyl radical selected from the group consisting of

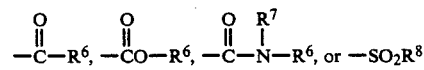

wherein
- $R^6$ is hydrogen, alkenyl or an unsubstituted or substituted alkyl, cycloalkyl or carbocyclic or heterocyclic aryl radical;
- $R^7$ is hydrogen or an unsubstituted or substituted alkyl radical;

R[8] is an unsubstituted or substituted alkyl, cycloalkyl or aryl radical; and

R[5] is carbonyl, dicarbonyl or a diacyl radical residue selected from the group consisting of

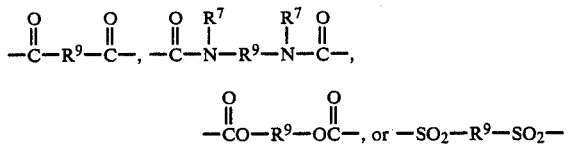

wherein R[7] is hydrogen or an unsubstituted or substituted alkyl radical and R[9] is a divalent organic linking group.

2. A composition according to claim 1 comprising a linear polyester having copolymerized therein or reacted therewith 50 to 100,000 ppm of a styryl residue derived from a mono-4-acyloxystyryl compound having the formula

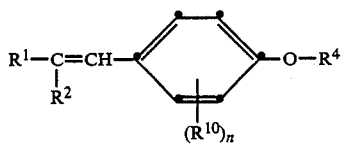

wherein

R[1] is cyano, carboxy, alkenyloxycarbonyl, or a substituted or unsubstituted alkoxycarbonyl, cycloalkoxycarbonyl or aryloxycarbonyl radical R[2] is one of the groups specified for R[1] or an unsubstituted or substituted carbamoyl, alkanoyl, cycloalkanoyl, aroyl, alkylsulfonyl, cycloalkylsulfonyl, arylsulfonyl or aromatic, carbocyclic or heterocyclic radical;

R[4] is

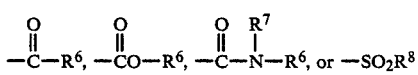

wherein

R[6] is hydrogen, alkenyl or an unsubstituted or substituted alkyl, cycloalkyl or carbocyclic or heterocyclic aryl radical;

R[7] is hydrogen or an unsubstituted or substituted alkyl radical;

R[8] is an unsubstituted or substituted alkyl, cycloalkyl or aryl radical;

R[10] is hydrogen, alkyl, alkoxy or halogen; and n is 1 or 2.

3. A composition according to claim 2 comprising a linear polyester having copolymerized therein 200 to 800 ppm of the styryl residue.

4. A composition according to claim 3 wherein the styryl residue is derived from a mono-4-acyloxystyryl compound having the formula

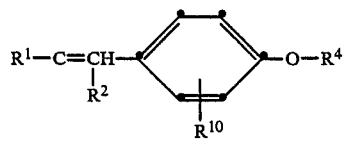

wherein

R[1] is cyano or lower alkoxycarbonyl;

R[2] is lower alkoxycarbonyl, phenyl or phenyl substituted with lower alkyl, carboxy or lower alkoxycarbonyl;

R[4] is lower alkanoyl, benzoyl or lower alkoxycarbonyl; and

R[10] is hydrogen, methyl, methoxy, ethoxy, or chloro.

5. A composition according to claim 4 wherein the styryl residue is derived from a mono-4-acyloxystyryl compound having the formula

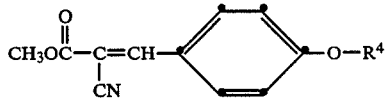

wherein R[4] is acetyl or methoxycarbonyl.

6. A composition according to claim 1 comprising a linear polyester having copolymerized therein or reacted therewith 50 to 100,000 ppm of a styryl residue derived from a bis-4-acyloxystyryl compound having the formula

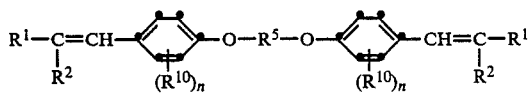

wherein each R[1] is cyano, carboxy alkenyloxycarbonyl or an unsubstituted or substituted alkoxycarbonyl, cycloalkoxycarbonyl or aryloxycarbonyl radical R[2] is one of the groups specified for R[1] or an unsubstituted or substituted carbamoyl, alkanoyl, cycloalkyanoyl, aroyl, alkylsulfonyl, cycloalkylsulfonyl, arylsulfonyl or aromatic, carbocyclic or heterocyclic radical;

R[5] is carbonyl, dicarbonyl or a diacyl residue having the formula

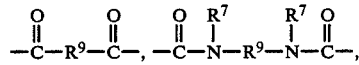

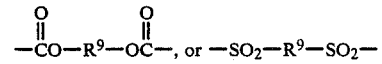

wherein R[7] is hydrogen or an unsubstituted or substituted alkyl radical and R[9] is a divalent organic linking group;

R[10] is hydrogen, alkyl, alkoxy, or halogen; and n is 1 or 2.

7. A composition according to claim 6 comprising a linear polyester having copolymerized therein 200 to 800 ppm of the styryl residue.

8. A composition according to claim 7 wherein the styryl residue is derived from a bis-4-acyloxystyryl compound having the formula

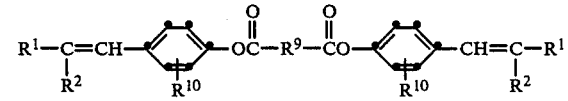

wherein each R[1] is cyano or lower alkoxycarbonyl each $R^2$ is lower alkoxycarbonyl, phenyl or phenyl substituted with lower alkyl, carboxy or lower alkoxycarbonyl;

$R^9$ is lower alkylene or phenylene; and $R^{10}$ is hydrogen, methyl, methoxy, ethoxy, or chloro.

9. The composition of any one of claims 3–8 wherein the polyester acid moiety is comprised of at least about 50 mol % terephthalic acid residue, and the glycol moiety at least about 50 mol % ethylene glycol or 1,4-cyclohexanedimethanol residue.

10. The composition of any one of claims 3–8 wherein the polyester is comprised of from about 75 to 100 mol % terephthalic acid residue and from about 75 to 100 mol % ethylene glycol residue.

11. The composition of claim 1 wherein the polymer is unsaturated polyester having an acid moiety comprised of fumaric or maleic acid or mixtures thereof and up to about 60 mol % of one or a mixture of o-phthalic, iso-phthalic, or terephthalic acids, and having a glycol moiety comprised of one or a mixture of propylene glycol, neopentyl glycol, 2,2,4-trimethyl-1,3-pentanediol, ethylene glycol or diethylene glycol.

12. The composition of claim 11 wherein the acid moiety is comprised of from about 75 to 100 mol % o-phthalic acid and maleic acid in a mole ratio of from about ½ to about 2/1, and the glycol moiety is comprised of from about 75 to 100 mol % propylene glycol.

13. A formed article of the composition of any one of claims 2, 4, 5, 7 or 8.

14. A composition according to claim 1 wherein the polymer is a linear polyester having reacted therein a total of about 2.0 to 10.0 weight percent of the residue of a difunctional styryl residue derived from a difunctional 4-acyloxystyryl compound or mixture of compounds of the formula set forth in claim 1.

* * * * *